United States Patent
Shepherd et al.

(10) Patent No.: US 10,484,303 B2
(45) Date of Patent: Nov. 19, 2019

(54) REPLICATION WITH DEDICATED METAL DEPLOYMENT IN A CLOUD

(71) Applicant: CISCO TECHNOLOGY, INC., San Jose, CA (US)

(72) Inventors: Gregory J. Shepherd, Eugene, OR (US); Ijsbrand Wijnands, Leuven (BE); Neale Ranns, Basingstoke (GB); David Ward, Los Gatos, CA (US); Michael Francis O'Gorman, Redwood City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 141 days.

(21) Appl. No.: 15/689,027

(22) Filed: Aug. 29, 2017

(65) Prior Publication Data

US 2019/0068524 A1  Feb. 28, 2019

(51) Int. Cl.
| | |
|---|---|
| *H04L 12/931* | (2013.01) |
| *H04L 29/08* | (2006.01) |
| *H04L 12/18* | (2006.01) |
| *H04L 29/06* | (2006.01) |
| *H04L 12/761* | (2013.01) |

(52) U.S. Cl.
CPC .......... *H04L 49/201* (2013.01); *H04L 12/184* (2013.01); *H04L 12/189* (2013.01); *H04L 49/70* (2013.01); *H04L 67/1002* (2013.01); *H04L 67/1095* (2013.01); *H04L 45/16* (2013.01); *H04L 69/163* (2013.01)

(58) Field of Classification Search
CPC .............................. H94L 49/201; H04L 49/70
See application file for complete search history.

(56) References Cited

U.S. PATENT DOCUMENTS

| | | | |
|---|---|---|---|
| 8,320,374 B2 | 11/2012 | de Heer | |
| 8,325,726 B2 | 12/2012 | Baban et al. | |
| 8,848,728 B1 | 9/2014 | Revah et al. | |
| 9,438,432 B2 | 9/2016 | Shepherd et al. | |
| 2011/0170542 A1* | 7/2011 | Liu | .......................... H04L 12/18 370/390 |
| 2013/0329605 A1* | 12/2013 | Nakil | ................... H04L 41/0668 370/255 |
| 2015/0085635 A1 | 3/2015 | Wijnands et al. | |
| 2015/0131660 A1 | 5/2015 | Shepherd et al. | |
| 2016/0191372 A1* | 6/2016 | Zhang | ..................... H04L 45/16 370/390 |
| 2016/0269324 A1* | 9/2016 | Banavalikar | ............ H04L 49/70 |
| 2016/0285641 A1* | 9/2016 | He | ......................... H04L 12/185 |
| 2017/0331746 A1* | 11/2017 | Qiang | ..................... H04L 45/16 |

* cited by examiner

*Primary Examiner* — Albert T Chou
(74) *Attorney, Agent, or Firm* — Cindy Kaplan (57) ABSTRACT

In one embodiment, a method includes receiving from a host node comprising a tenant multicast application with a single tenant deployment, an encapsulated multicast packet over unicast at a virtual replicator, the encapsulated multicast packet comprising receiver information for the virtual replicator, replicating the encapsulated multicast packet at the virtual replicator, and transmitting the encapsulated multicast packet over unicast to a plurality of receiving nodes based on the receiver information. The receiving nodes comprise the tenant multicast application and the virtual replicator operates in a cloud without multicast capability. An apparatus is also disclosed herein.

20 Claims, 8 Drawing Sheets

REPLICATION WITH DEDICATED METAL DEPLOYMENT IN A CLOUD

TECHNICAL FIELD

The present disclosure relates generally to communication networks, and more particularly, to replication in a cloud.

BACKGROUND

To support a demand to provide applications that involve high data rate transmission to multiple hosts, multicast routing has evolved. Multicast routing is used to send data communications to multiple receivers on a network utilizing a multicast address. By sending only a single transmission stream intended for multiple receivers, multicast conserves bandwidth. Multicast is often used by financial service providers and professional media content generators in a wide range of multicast applications, which depend on network support of multicast for network replication of traffic to all receivers. However, multicast is not widely deployed outside of private data centers and walled garden networks.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving from a host node comprising a tenant multicast application with a single tenant deployment, an encapsulated multicast packet over unicast at a virtual replicator, the encapsulated multicast packet comprising receiver information for the virtual replicator, replicating the encapsulated multicast packet at the virtual replicator, and transmitting the encapsulated multicast packet over unicast to a plurality of receiving nodes based on the receiver information. The receiving nodes comprise the tenant multicast application and the virtual replicator operates in a cloud without multicast capability.

In another embodiment, an apparatus generally comprises a tenant multicast application, a packet processing instance associated with the tenant multicast application, a processor for inserting receiver information into a multicast packet and transmitting the multicast packet over unicast to a virtual replicator configured to replicate the multicast packet and transmit replicated packets over unicast to a plurality of receiving nodes based on the receiver information, and memory for storing the receiver information. The apparatus is configured for single tenant deployment in a cloud without multicast capability.

In another embodiment, a system generally comprises a plurality of local packet processing instances running on a plurality of hosts, each of the hosts comprising one tenant in a dedicated metal deployment, each of the local packet processing instances associated with a tenant multicast application and configured to encapsulate a multicast packet with receiver information and transmit the multicast packet to a dedicated virtual replicator. The system further comprises the dedicated virtual replicator for replicating the multicast packet received from one of the hosts and transmitting replicated multicast packets to a portion of the hosts based on the receiver information. The multicast packets are transmitted over unicast in a cloud without multicast capability.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Multicast is used to simultaneously deliver a single stream of information to numerous recipients and is particularly useful for streaming media (e.g., television, movies, radio), video conferences, data that needs to be sent to a select group of subscribers (e.g., news articles, financial information (stock quotes, time sensitive information)), or transmitting other content to multiple receivers. Multicast operation is based on the concept of a group. A multicast group is an arbitrary group of receivers that expresses an interest in receiving a particular data stream. An IP (Internet Protocol) multicast address, or a portion thereof, specifies a particular group. A receiver expresses interest in receiving packets sent to a specific multicast address. Hosts that are interested in receiving data flowing to a particular group, join the group using Internet Group Management Protocol (IGMP) or Multicast Listener Discovery (MLD), for example. A multicast source sends packets with the destination IP address set to a particular multicast group address.

Multicast applications depend on network support of multicast for network replication of traffic to all receivers. In order to use IP multicast applications in public cloud provider networks that do not support IP multicast, the multicast applications would have to be rewritten as unicast-only applications or a full mesh of GRE (Generic Routing Encapsulation) tunnels would need to be statically configured. Re-writing of the multicast application is a significantly expensive and complex endeavor yielding limited performance. Unicast conversions or a full mesh of GRE tunnels of high bit-rate or high fan-out applications cannot support the aggregate data rate needed to send unicast copies to each receiver from a single source. In one example, a unicast converted solution may ingress replicate, resulting in a need for maximum compute and bandwidth resources at every end system, thus creating an expensive solution to deploy.

The embodiments described herein are directed to a virtual replicating Clos in a cloud (referred to herein as VRCC), which provides a replicating overlay network that is transparent to IP multicast applications, thereby allowing the applications to operate as if they are on a network that supports IP multicast, without any modifications in high compute resources deployments where each tenant application uses dedicated metal. The embodiments allow for existing multicast applications to be deployed, independent of the underlying network infrastructure or application locations, thereby severing the dependence of multipoint applications on the underlying network devices in the network. The embodiments may be used, for example, for high processing demand applications that need dedicated metal deployment in the cloud, for which on-host replication cannot be utilized. As described in detail below, one or more embodiments may use a one, two, or three stage replication architecture that can scale dynamically to minimize compute and bandwidth requirements in a network, thus providing a more cost effective and scalable solution than a unicast replacement of multicast applications.

One or more embodiments allow multicast service over a network, such as a data center network, where network supported multicast is not available. There is no dependency on any IP multicast support by a cloud provider, no change is needed to the multicast server/client applications, and there are no additional requirements on the unicast deployment. One or more embodiments may support different multicast applications, including for example, ASM (Any Source Multicast), SSM (Source Specific Multicast), or BiDir (BiDirectional).

The embodiments operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

As previously noted, the embodiments provide a virtual replicating Clos in a cloud. Clos networks are multistage networks that provide benefits such as the availability of equal cost multipath based fabric, use of simplified and lower port density core network devices, and a fully utilized link bandwidth on each network node. The Clos design also allows the networks to scale and grow incrementally on demand. The cloud may comprise, for example, a Virtual Private Cloud (VPC) comprising an on-demand configurable pool of shared computing resources allocated within a public cloud environment. Cloud computing enables network access to a shared pool of configurable resources that can be rapidly provisioned and released with minimal management effort.

The embodiments described herein operate in a dedicated metal (bare metal, single VM (Virtual Machine)/container) deployment (also referred to herein a single tenant deployment), which uses a single tenant server (i.e., one tenant application per host).

Figure 1:
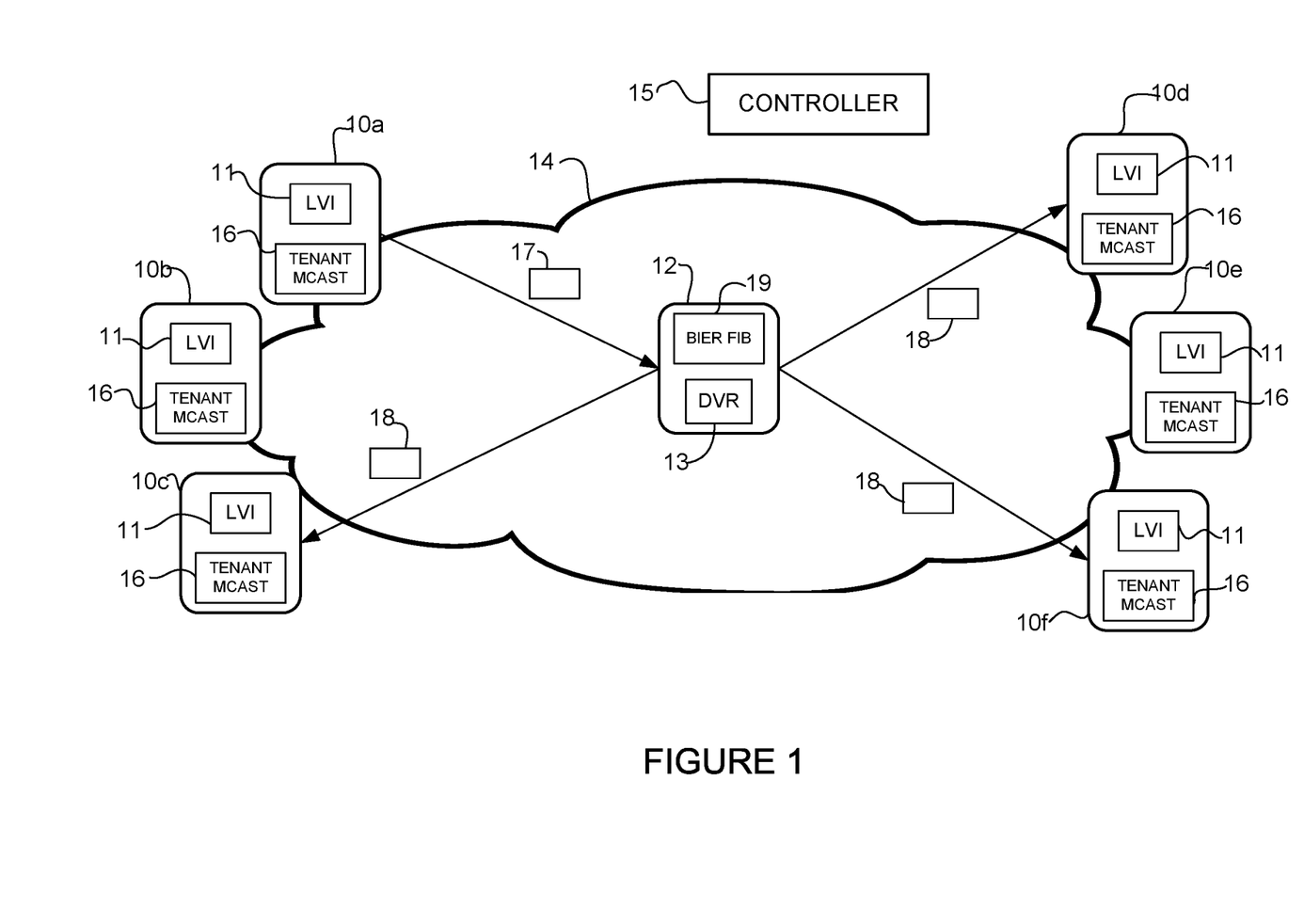
FIG. 1 illustrates an example of a network in which embodiments described herein may be implemented.

Referring now to the drawings, and first to FIG. 1, an example of a network in which embodiments described herein may be implemented is shown. For simplification, only a small number of nodes (network devices) are shown. FIG. 1 illustrates a single stage VRCC system comprising a plurality of Local VPP (Vector Packet Processing) Instances (LVIs) (also referred to herein as packet processing instances) 11 and a Dedicated Virtual Replicator (DVR) 13 for replicating content (message, data, audio, video, etc.) transmitted from a sender LVI to receiver LVIs. In the example of FIG. 1, multiple host nodes 10a, 10b, 10c, 10d, 10e, 10f each comprising an LVI 11, are in communication with a virtual replicator node 12 comprising a DVR 13 in a cloud 14. As described in detail below with respect to FIGS. 5A and 5B, the LVI 11 runs in the same VM/container as a tenant multicast application 16. A controller 15 is in communication with the nodes 10a, 10b, 10c, 10d, 10e, 10f, and 12.

The VRCC topology is a non-looping hub-and-spoke topology operating as an overlay network to the underlying cloud network. The host nodes 10, 10b, 10c, 10d, 10e, 10f, virtual replicator node (or virtual replicator nodes) 12, and controller 15 form the replicating overlay network extending over the underlying network (e.g., public cloud), which does not have multicast capability. There is no IGP (Interior Gateway Protocol) needed in the overlay and reachability convergence is dependent only on the underlay.

In the example shown in FIG. 1, host 10a operates as a sending LVI and nodes 10c, 10d, and 10f operate as receiving LVIs. Host nodes operating with receiving LVIs 11 are referred to herein as receiving nodes or Remote Virtual Replicators (RVRs), since they are part of the virtual replicating network and may also perform replication. Thus, the term "receiving node" as used herein may refer to a host node (LVI node) running the tenant multicast application 16 and configured to receive replicated packets from the virtual replicator node 12. As described below with respect to FIG. 8, the receiving node (RVR) may also operate as a replicator. As previously noted, the embodiments may be implemented in a single stage (FIG. 1) or multi-stage (FIGS. 7 and 8) architecture. Thus, the network may include any number of host nodes 10a, 10b, 10c, 10d, 10e, 10f (operating as sending LVIs, receiving LVIs, or both sending and receiving LVIs) or virtual replicator nodes 12.

The sending LVI 11 only needs to send a single packet to the DVR 13, which then replicates to all member RVRs (receiving nodes) defined in a packet header (described below). Replication bandwidth is therefore minimized in and out of hosts, and there is no additional load on the local host. As shown in the example of FIG. 1, host node 10a transmits a packet (network message, datagram, frame) 17 to virtual replicator node 12, which replicates the packet and sends replicated packets 18 to multiple RVRs 10c 10d, 10f (receiving nodes). As described in detail below, the packets 17, 18 comprise encapsulated multicast packets and are sent over unicast in the underlying network. The packet comprises receiver information (multicast membership information for the DVR) in a header generated at the sender LVI 11 based on information received from the controller 15 or membership signaling protocol packets, for example.

In one or more embodiments, the LVI 11 snoops for multicast traffic, control information, and data. Multicast data is encapsulated by the LVI 11 and transmitted over unicast on the underlying network to one or more DVRs 13. The sending LVI 11 has information as to the reachability of the DVR 13 and transmits multicast traffic with the overlay MAC (Media Access Control) address or IP address of the DVR. The receiver LVIs 11 only need the topology state and do not need the flow state (e.g., no (S, G)/(*, G) state).

Figure 6A:
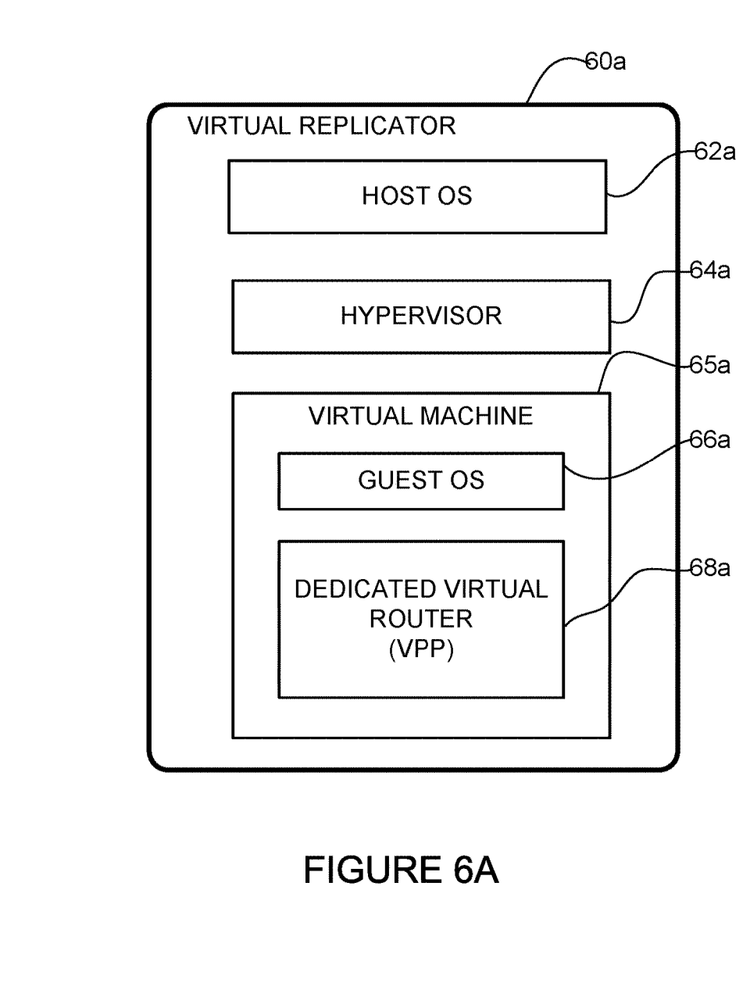
FIG. 6A illustrates an example of the virtual replicator in the network of FIG. 1 with virtual machine deployment.
Figure 6B:
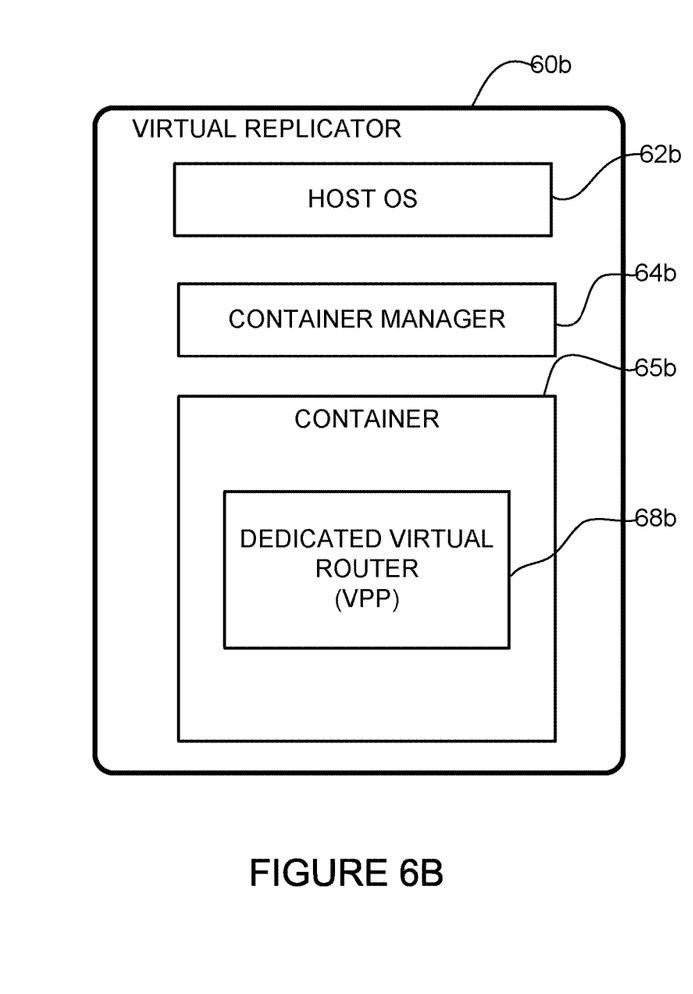
FIG. 6B illustrates an example of the virtual replicator in the network of FIG. 1 with container deployment.

Replication is centralized through deployment of the DVR (or DVRs) 13, which resides on a tenant bridge domain. As described in detail below with respect to FIG. 6, the virtual replicator 12 is a dedicated metal host with a single instance of a VPP (Vector Packet Processing) replicator (DVR). The DVR 13 only needs to know the topology state and does not need to know the flow state (i.e., (S, G)/(*, G) state) or membership. The DVR 13 receives membership information (receiver information) for only those RVRs to which the DVR is to send replicated packets. Thus, in the case of multiple DVRs, each DVR receives a unique subset of the membership for the multicast packet. In one or more embodiments, the membership information is contained in the packet header.

In one or more embodiments, the DVR 13 uses a Bit Indexed Explicit Replication (BIER) Forwarding Information Base (FIB) 19 to forward packets to the RVRs based on receiver information contained in the packet. The receiver (membership) information may comprise, for example, bit positions within a bit array used as an index into the BIER FIB 19 to specify which LVI nodes are to receive the replicated packets. As described below with respect to FIG. 8, if the LVI 11 is used for replication (e.g., three-stage replication), the BIER FIB 19 may also be located at the LVI node and used for replication at the receiving LVI.

In one embodiment, the VRCC functions as at least one BIER domain. BIER allows the amount of state information within a multicast network to be reduced by carrying receiver information in the packet rather than being looked up in tables at each network node based on source and group information. In one example BIER is implemented as described in U.S. Pat. No. 9,438,432, issued Sep. 6, 2016, which is incorporated herein by reference in its entirety. A group of receivers may be represented by an array of bits carried in a packet, which is forwarded based on the receiver information. This greatly reduces the amount of state information stored at nodes and is therefore also referred to as stateless multicast.

The term "receiver information" as used herein refers to multicast membership information (in terms of receiving LVIs) inserted into the packet by the sending LVI for use by the DVR in replicating and transmitting the packet to specified receiving nodes. In one embodiment, the receiver information comprises a BIER header containing a bit array, wherein bit positions specify the receiving LVIs for the DVR.

Receiver information may be included in the packet 17 by assigning each LVI 11 a bit position within a packet bit array carried by the packet. The packet bit array may be referred to as a bit mask. Each LVI 11 has a unique bit position in the bit mask. In one embodiment, the bit mask is encapsulated onto the multicast data packet (e.g., a header or payload information). The BIER domain mask size is no smaller than the tenant IP prefix size to ensure one-to-one mapping of bit position to host. The length of the bit arrays used in the network may be statically configured or dynamically assigned and distributed through the network. The bit array may have any suitable length.

In one embodiment, the bit position is used as an index into a forwarding table (BIER FIB 19) and packets are replicated only to specified nodes. The virtual replicator nodes 12 and receiving nodes operating as replicators are configured to store and use the BIER FIB 19. The BIER FIB 19 includes information (e.g., bit position, neighbor bit array) used by BIER enabled nodes to forward BIER packets.

A bit position may be statically or dynamically assigned. For example, bit assignments may be centrally assigned or hard coded from the tenant IP address. In one example, each LVI 11 in the domain can calculate its own bit assignment and each LVI and DVR 13 can extract the list of hosts from its local ARP (Address Resolution Protocol) table to calculate each of the other LVIs' bit positions to build its local BIER FIB 19. The BIER FIB 19 in each DVR (and replicating LVI) should be identical since it is only a one-to-one mapping. Thus, each virtual replicator 12 has the same BIER FIB—Overlay MAC/IP-to-bit position. Bit assignments may be made in-band or assigned by the controller 15. The DVR 13 may build the BIER FIB 19 based on assigned prefixes or the BIER FIB may be built at the controller 15 and pushed down. In one embodiment, the controller 15 assigns bit positions and pushes the BIER FIB 19 to the DVR 13 (and LVIs 11 for use in three-stage replication). ARP detection may be used to minimize the BIER FIB 19. Also, if the BIER FIB 19 is built at the DVR 13, a compressed BIER FIB may be sent by the controller 15.

The controller (controller application) 15 may be located in the tenant bridge domain and is in communication (either directly or indirectly) with all of the hosts 10a, 10b, 10c, 10d, 10e, 10f and virtual replicator 12 (FIG. 1). In one embodiment, the controller 15 uses an API (Application Programming Interface) layer to communicate using ODL (OpenDaylight). The controller 15 may deploy and monitor VRCC components (LVIs 11, DVRs 13). In one embodiment, the controller 15 uses real-time telemetry from the replication elements (e.g., PPS (packet per second), BPS (bits per second), latency, CPU, etc.). The controller 15 may scale the Clos network up or down based on need. For example, the controller 15 may deploy or destroy DVRs 13 as needed to scale replication with minimum resources (costs). The controller 15 may also send messages to LVIs 11 with DVR locations. In one or more embodiments, the controller 15 may assign ratings to one or more DVRs 13 to steer traffic from the LVI 11 to one or more DVRs or create a new DVR based on the telemetry data. In one example, the controller 15 may provide signal load-balancing logic for ingress LVIs (e.g., replication ratio for each stage). The controller 15 may also provide central membership signaling and accounting/billing of services.

Multicast applications 16 at the hosts may send packets regardless of whether there are receivers. In conventional multicast, these packets would arrive at a first-hop-router and be dropped until there was an active forwarding state. In a VRCC implementation, the LVI 11 will prevent these multicast packets from consuming resources on the host. If member bits are set, BIER imposition is performed by the LVIs. The sender LVIs only needs to know the IP or MAC address of the DVR in the BIER domain. In the single stage replication shown in the example of FIG. 1, BIER disposition is performed by the receiving LVI 11 and the multicast packet is delivered to the unmodified multicast receiving application 16.

The VRCC system does not dictate any particular membership signaling protocol. BGP (Border Gateway Protocol), flooded in-band PIM (Protocol Independent Multicast), IGMP (Internet Group Management Protocol), or an external controller may be used. Membership signaling may be performed, for example, statically, in-band (e.g., IGMP over BIER), or using BGP (e.g., route reflector application in controller). For IGMP over BIER, the LVI 11 snoops IGMP messages and sends information over BIER.

Each LVI 11 learns of its bit members via the membership mechanism and maintains a mask of members. For example, when a receiver wants to join a multicast group, the receiver sends a message (e.g., using IGMP) to the receiving host node 10c, 10d, 10f (containing the receiving LVI 11) that the receiver is coupled to (either directly or indirectly). The message includes information identifying the multicast group the receiver wants to join and/or information identifying a source associated with the group. In response to receiving a message indicating that a receiver wants to join a multicast group, the host (receiving node) 10c, 10d, 10f signals its interest in the multicast group identified in the message. This involves, for example, the host sending a message to the LVIs or to the controller 15 indicating the host's interest in the multicast group. In the case of BGP membership signaling, the controller 15 may also have a route reflector application to minimize BGP configuration and signaling between the LVIs 11. Join or unsubscribe messages result in the hosts changing the bit mask associated with a given multicast group. DVRs 13 need no membership information and no changes are made to the virtual replicator nodes 12. As previously described, the DVR 13 forwards packets through the network based on the bit mask.

When an application migrates to another host in the VRCC, since its bit assignment remains unchanged, this constitutes a change in underlay topology only. No multicast membership information needs to be signaled and no forwarding state needs to be built. The VRCC will begin replicating to the new location of the bit (LVI) and the underlay will handle all physical reachability.

It is to be understood that the network devices and topology shown in FIG. 1 and described above is only an example and the embodiments described herein may be implemented in networks comprising different network topologies or network devices, or using different protocols or processes, without departing from the scope of the embodiments. For example, each host node may be in communication with any number of sources or receivers in one or more networks. The network may include any number or type of network devices that facilitate passage of data over the network (e.g., routers, switches, gateways, controllers, appliances), network elements that operate as endpoints or hosts (e.g., servers, virtual machines, containers, clients), and any number of network sites or domains in communication with any number of networks. Thus, network nodes may be used in any suitable network topology, which may include any number of servers, virtual machines, containers, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
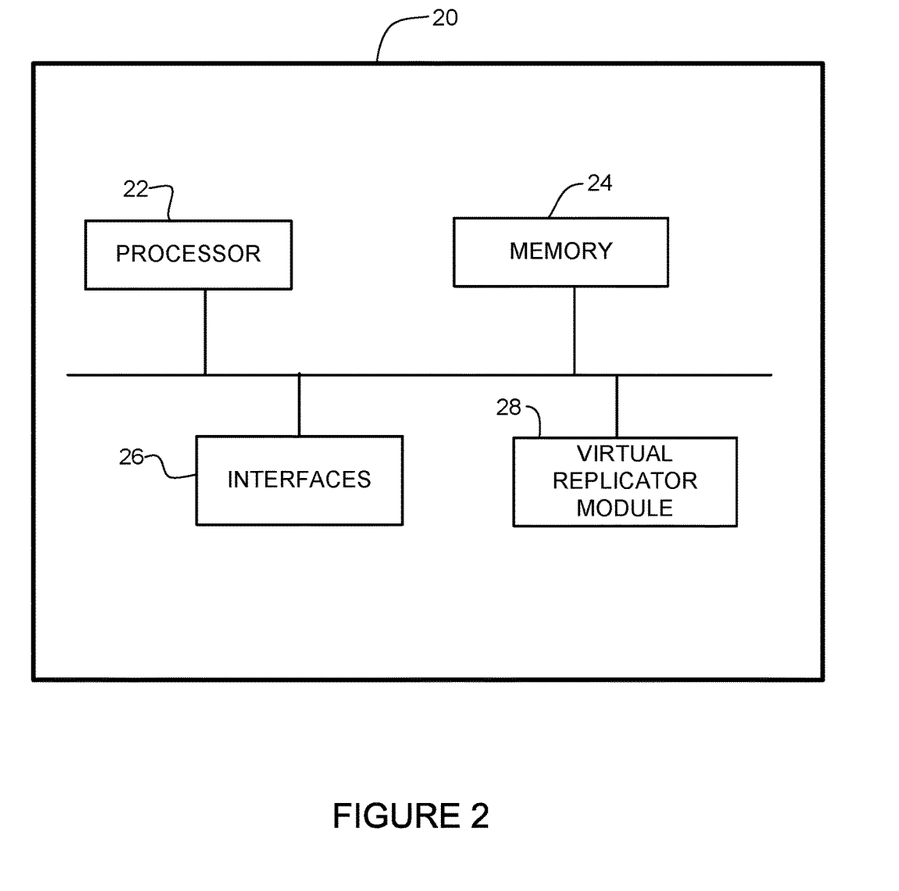
FIG. 2 depicts an example of a network device useful in implementing embodiments described herein.

FIG. 2 illustrates an example of a network device 20 (e.g., host 10a, 10b, 10c, 10d, 10e, 10f or virtual replicator 12 in FIG. 1 (e.g. server, edge node, sender, receiver, core node, BIER-enabled node, bit-forwarding-router)) that may be used to implement the embodiments described herein. In one embodiment, the network device is a programmable machine that may be implemented in hardware, software, or any combination thereof. The network device includes one or more processor 22, memory 24, network interfaces 26, and virtual replicator module 28 (e.g., LVI 11 or DVR 13 in FIG. 1).

Memory 24 may be a volatile memory or non-volatile storage, which stores various applications, operating systems, modules, and data for execution and use by the processor. Memory 24 may store one or more components (e.g., logic, software, code, firmware) for virtual replicator module 28. For nodes 12 (containing DVRs 13) and nodes (containing LVIs 11) that operate as third stage replicators, memory 24 may also include the BIER FIB 19. The device 20 may include any number of memory components.

The network device 20 may include any number of processors 22 (e.g., single or multi-processor computing device or system), which may communicate with a forwarding engine or packet forwarder operable to process a packet or packet header. The processor 22 may receive instructions from a software application or module, which causes the processor to perform functions of one or more embodiments described herein.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The logic may be operable to perform one or more steps shown in the flowcharts of FIGS. 3 and 4.

The network interfaces 26 may comprise any number of interfaces (line cards, ports) for receiving data or transmitting data to other devices. The network interface may include, for example, an Ethernet interface for connection to a computer or network. The network interfaces 26 may be configured to transmit or receive data using a variety of different communication protocols and may include mechanical, electrical, and signaling circuitry for communicating data over physical links coupled to the network. For example, line cards may include port processors and port processor controllers.

The virtual replicator module 28 may comprise for example, logic, code, software, firmware, or other components, modules, or devices for performing processes described below with respect to FIGS. 3 and 4. On hosts 10a, 10b, 10c, 10d, 10e, 10f, the virtual replicator module 28 may operate as the LVI 11 and on network devices 12 the virtual replicator module may operate as the DVR 13. On receiving nodes, the virtual replicator module may also perform third stage replication.

It is to be understood that the network device 20 shown in FIG. 2 and described above is only an example and that different configurations of network devices may be used. For example, the network device may further include any suitable combination of hardware, software, processors, devices, components, or elements operable to facilitate the capabilities described herein.

Figure 3:
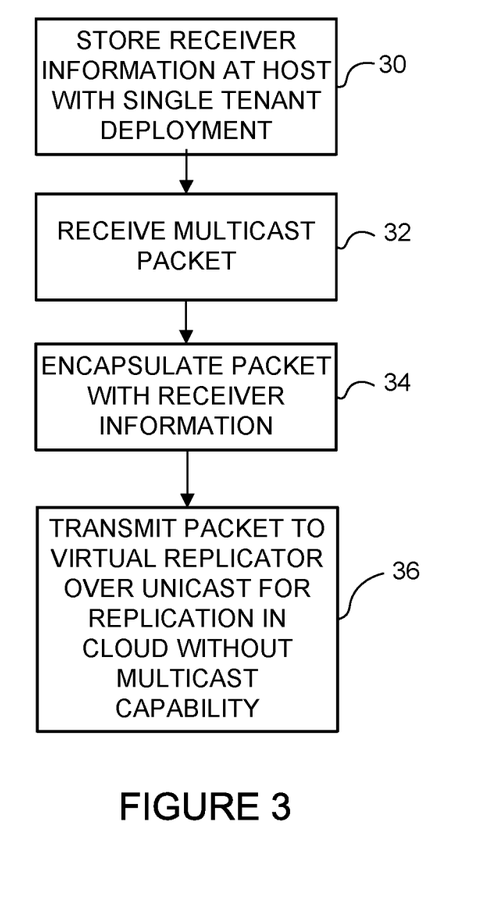
FIG. 3 is a flowchart illustrating a process at a host in the network of FIG. 1 for use in a virtual replicating network, in accordance with one embodiment.

FIG. 3 is a flowchart illustrating an overview of a process at the host 10a in the network of FIG. 1. A packet processing instance (LVI) 11 at the host 10a snoops for multicast traffic, control information, and data, and may also receive membership information from the controller 15 (FIG. 1). The packet processing instance 11 stores receiver information (e.g., mask of members) (step 30). The host 10a receives a multicast packet at step 32 (e.g., receives a multicast packet from another device or generates a multicast packet). The tenant multicast application accesses a packet processing instance associated with the multicast application. For example, the tenant multicast application 16 may open a socket to the LVI (packet processing instance) 11 (FIGS. 1 and 3). The LVI 11 encapsulates the multicast packet with receiver information (e.g., BIER membership header) (step 34). As previously noted, the sender LVI 11 only needs to know the IP or MAC address for the DVR (or a list of IP/MAC addresses for each DVR for multi-stage replication) in the BIER domain. Traffic is forwarded over unicast to one or more virtual replicators 13 in a cloud without multicast capability (step 36).

Figure 4:
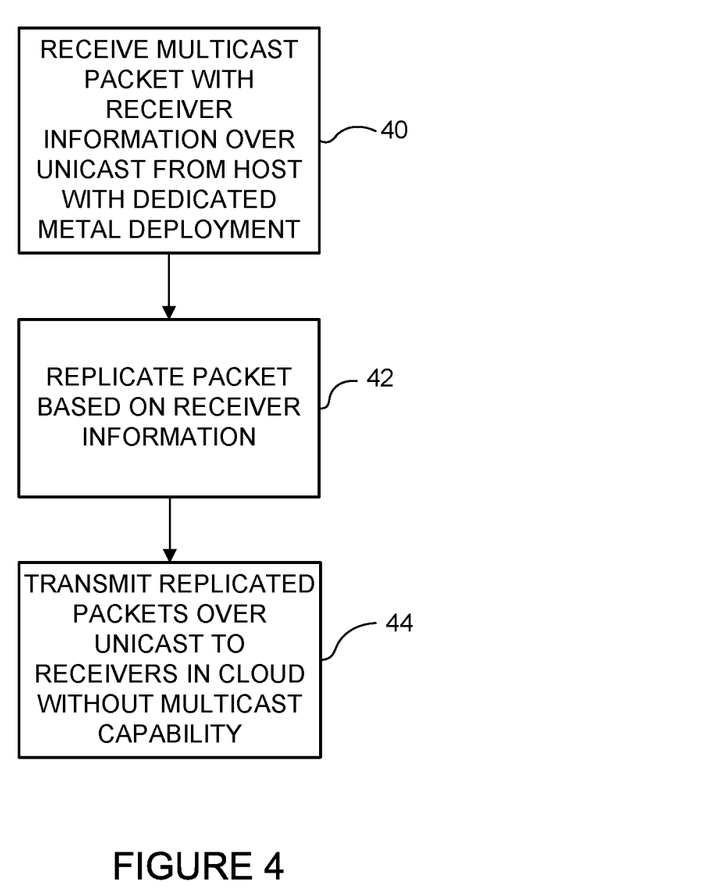
FIG. 4 is a flowchart illustrating a replication process at a virtual replicator in the network of FIG. 1, in accordance with one embodiment.

FIG. 4 illustrates an overview of a replication process at a virtual replicator node (e.g., node 12 containing DVR 13 in FIG. 1), in accordance with one embodiment. The virtual replicator node 12 receives a multicast packet from a packet processing instance (LVI 11) associated with tenant multicast application 16 at host node 10a with a dedicated metal (single tenant) deployment (step 40) (FIGS. 1 and 4). The packet is an encapsulated multicast packet received over unicast at the virtual replicator and comprises a header containing receiver information (e.g., subset of membership mask) for a multicast group. A previously described, the virtual replicator 12 is operating in a public cloud without multicast capability. The DVR 13 replicates the multicast packet and transmits the multicast packet over unicast to a plurality of receiver nodes (RVRs 10c, 10d, 10f in FIG. 1) based on the receiver information in the packet header (steps 42 and 44). In one embodiment, BIER disposition is performed by a receiving packet processing instance (LVI 11) at a receiving node and the multicast packet is delivered to the unmodified multicast receiving application 16.

It is to be understood that the processes shown in FIGS. 3 and 4, and described above are only examples and that steps may be added, modified, removed, or reordered, without departing from the scope of the embodiments.

Figure 5A:
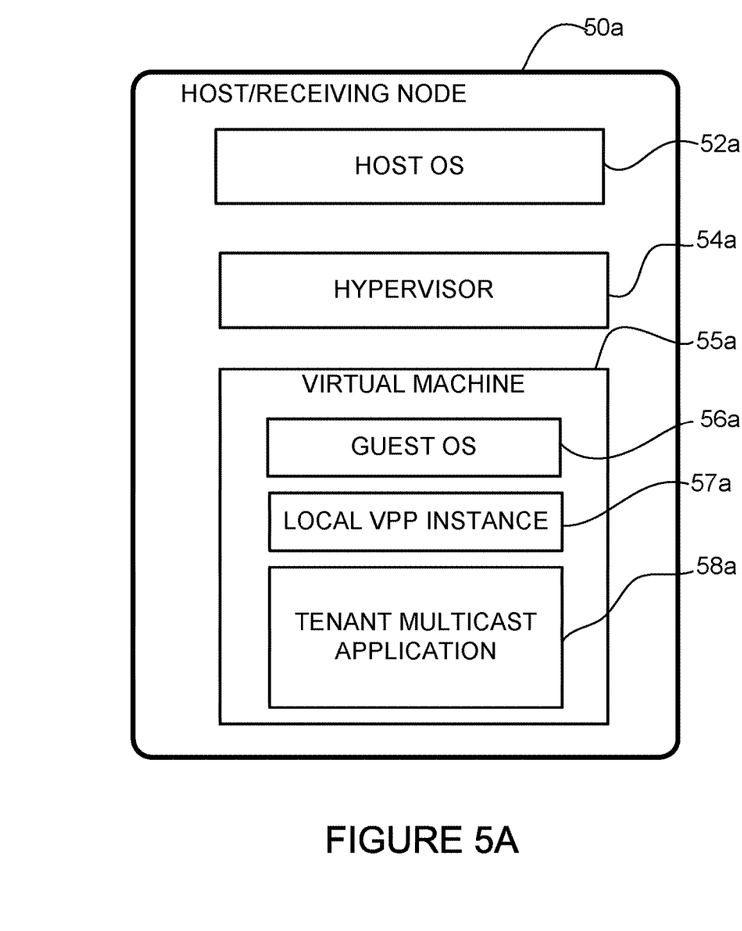
FIG. 5A illustrates an example of the host in the network of FIG. 1 with virtual machine deployment.

FIG. 5A is a block diagram illustrating components of an LVI host node 50a (host, receiving node), in accordance with one embodiment. The host 50a includes host operating system (Host OS) 52a and a hypervisor 54a for use in provisioning a virtual machine 55a on the server. In one embodiment, a VTAP (Virtualized Network Tap) is in the hypervisor layer 54a. In the example shown in FIG. 5A, LVI 57a is a VPP running in the same virtual machine as tenant multicast application 58a. The tenant multicast application 58a uses a dedicated host for performance. As previously noted, VRCC is configured for dedicated metal deployment (i.e., only one tenant application per host). The multicast application VM 55a has an instance of LVI 57a, which owns the VM NIC (Virtual Machine Network Interface Card). The virtual machine 55a further includes a guest operating system 56. As previously described, sender LVIs do not need the BIER FIB and receiver LVIs only need the BIER FIB for third stage replication. The LVIs use DVR addresses to forward packets. If there are multiple DVRs, the LVI may select DVR load-balance logic by splitting a membership mask between DVRs (e.g., even bits, based on cost using information from controller, which can prune list of DVRs in case of failure or based on availability).

Figure 5B:
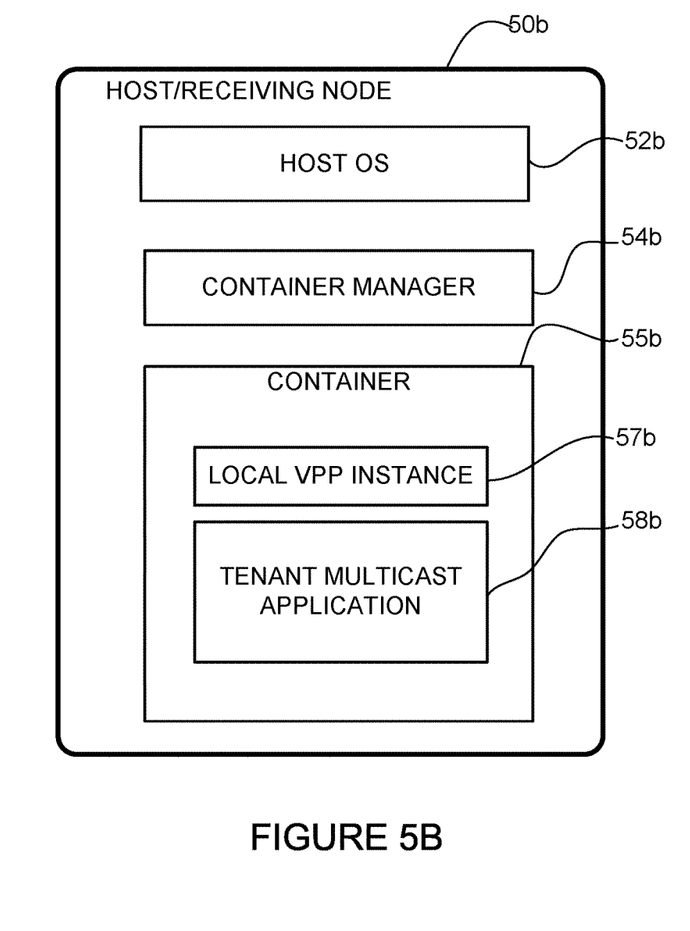
FIG. 5B illustrates an example of the host in the network of FIG. 1 with container deployment.

FIG. 5B is a block diagram illustrating components of an LVI host node 50b (host, receiving node), in accordance with one embodiment. The host 50b includes host operating system (Host OS) 52b and a container manager 54b. In the example shown in FIG. 5B, LVI 57b is a VPP running in the same container as tenant multicast application 58b. The tenant multicast application 58b uses a dedicated host for performance. As previously noted, VRCC is configured for dedicated metal deployment (i.e., only one tenant application per host).

FIG. 6A is a block diagram illustrating components of a virtual replicator 60a (node 12 in FIG. 1), in accordance with one embodiment. The virtual replicator 60a includes a host operating system 62a and hypervisor 64a, as described above for the host 50a. The virtual replicator 60a further includes at least one virtual machine 65a having a guest operating system 66a and DVR 68a running thereon. The DVR 68a has a single instance of a VPP replicator operable to replicate a packet received from the sender LVI and transmit to all member RVRs. In one or more embodiments, BIER replication is performed by the DVR 68a. As previously noted, no membership state needs to be maintained at the DVRs. Virtual machine migration may be performed without membership signaling since there is no forwarding tree or state at the DVR 68a.

FIG. 6B is a block diagram illustrating components of a virtual replicator 60b (node 12 in FIG. 1), in accordance with one embodiment. The virtual replicator 60b includes a host operating system 62b and container manager 64b, as described above for the host 50b. The virtual replicator 60b further includes at least one container 65b having a DVR 68b running thereon. The DVR 68b has a single instance of a VPP replicator operable to replicate a packet received from the sender LVI and transmit to all member RVRs. In one or more embodiments, BIER replication is performed by the DVR 68b.

Figure 7:
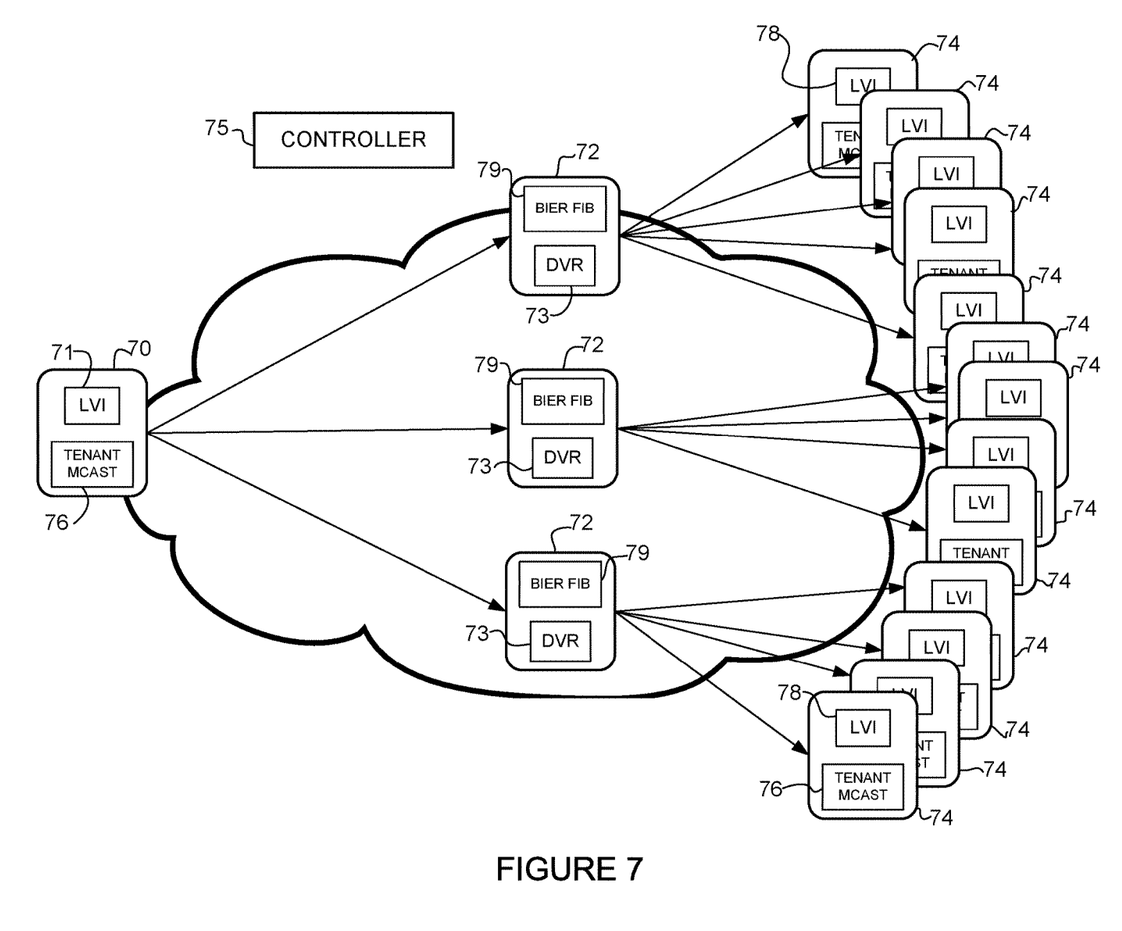
FIG. 7 illustrates two-stage replication, in accordance with one embodiment.

FIG. 7 illustrates an example of VRCC two-stage replication with a host 70 comprising a sender LVI 71, a plurality of virtual replicators 72 comprising DVRs 73, and a plurality of hosts 74 with receiver LVIs 78. The host nodes 70, 74 and virtual replicators 72 are in communication with controller 75. As described above with respect to FIG. 1, the host nodes 70, 74 include tenant multicast applications 76 and the virtual replicators comprise BIER FIBs 79. Multiple DVRs 73 are deployed to support a larger replication domain. In one or more embodiments, the sending LVI 71 has a list of IP/MAC addresses for each DVR 73 and may perform a local decision as to how to load balance between the DVRs. In one example, the sending LVI 71 splits the membership mask evenly between the number of DVRs 73 deployed. The controller 75 may also partition use based on status updates (e.g., CPU/bandwidth load, latency, etc.) and signal the decision or logic to all sending LVIs 71. Other load balancing methods may be used. Each DVR 73 gets a unique subset of the membership mask for that packet and will replicate and forward to the LVIs 78 for which bits are set in the receiving mask using the local BIER FIB 79, clearing all other bits in the mask to each LVI receiver 78.

Figure 8:
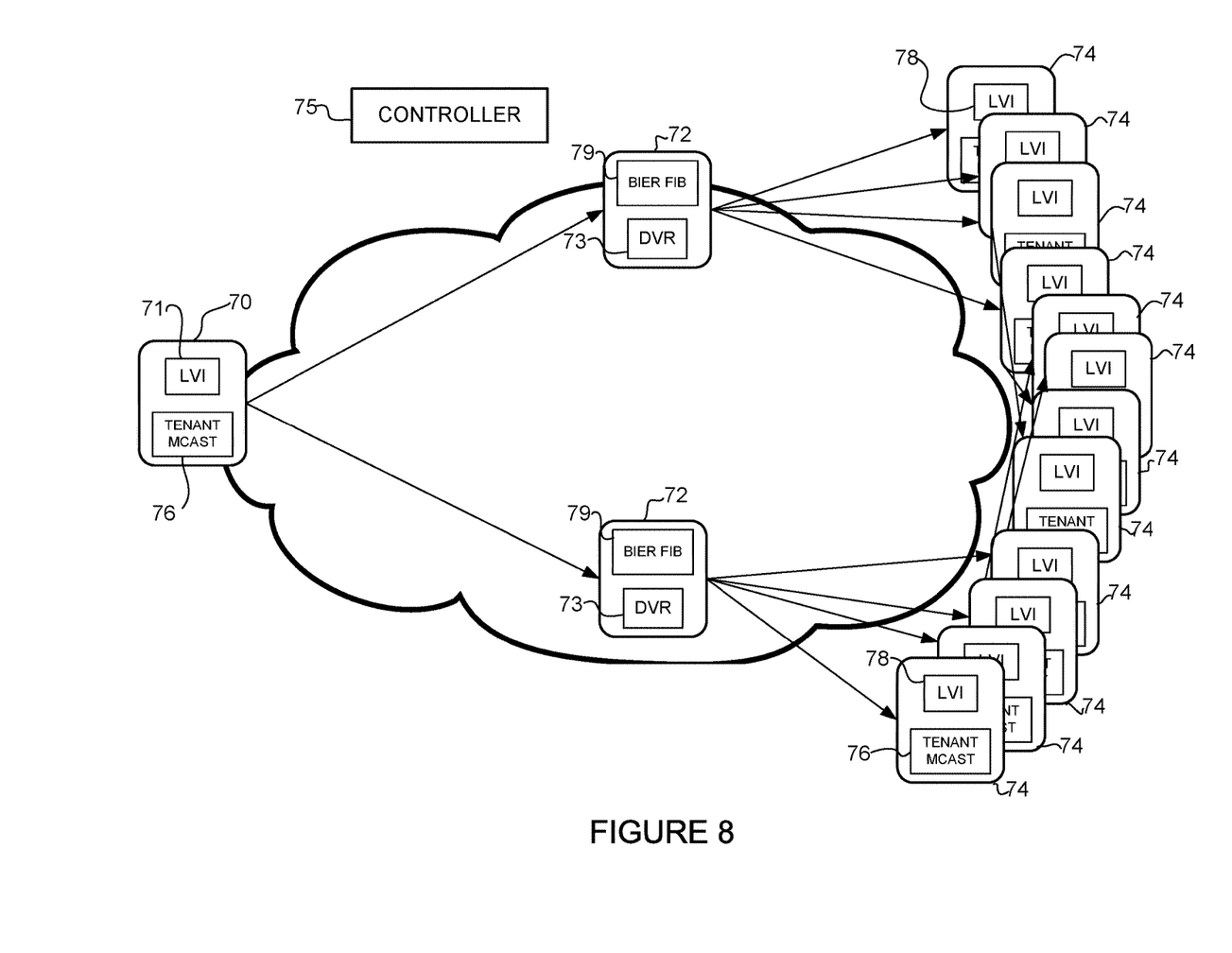
FIG. 8 illustrates three-stage replication, in accordance with one embodiment.

FIG. 8 illustrates an example of VRCC three-stage replication, in accordance with one embodiment. Once configured by the controller 75, the DVRs 73 split the replication load across the LVIs 78 in the mask, setting only the receiving LVI's bit and one or more other bits from the incoming mask. Each packet sent to receiving LVI 78 from the DVR 73 will have a unique mask. Using BIER forwarding logic, the receiving LVI 78 walks the mask, and using the local BIER FIB, finds its local set bit and replicates to the local tenant virtual machine/container. If there are other bits set in the mask, the receiving LVI 78 will then replicate and forward to each of the LVIs for which there is a set bit, clearing all other bits. The BIER FIB at the receiver LVIs 78 (not shown) may be hard coded from the VM IP addresses or assigned centrally by a controller application.

As can be observed from the foregoing, the embodiments described herein provide numerous advantages. For example, one or more embodiments allow IP multicast applications to migrate from IP multicast enabled networks to cloud provider networks that have no multicast support in the underlay, without modification to the network or applications. Single or multi-stage replication of VRCC can scale dynamically to minimize compute and bandwidth requirements in the network, thus providing a more cost effective and scalable solution than a unicast replacement of the service. Multipoint application customers, such as financial service providers and professional media content generators, may instantiate their current multicast applications without modification, into a third party cloud provider and operate as if network supported replication was in place. Existing multicast applications may be deployed into a third party cloud provider using the VRCC components and procedures. Replication can be setup either statically at deployment or dynamically through controller signals based on load requirements of the overall tenant application bandwidth or fan-out. In one or more examples, VPP is efficient enough that a single core can fill two 10 GE interfaces or a PCI bus depending on packet sizes. In this way, dedicated metal tenant application deployments may accommodate minimal ingress replication through the LVI, either as the first or third replication stage. In one or more embodiments, VRCC provides for seamless application migration without any member query or signaling for very fast and deterministic convergence.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving from a host node comprising a tenant multicast application with a single tenant deployment, an encapsulated multicast packet over unicast at a virtual replicator, the encapsulated multicast packet comprising receiver information for the virtual replicator, said receiver information comprising multicast membership information inserted into the packet by the host node for use in replicating and transmitting the packet to a plurality of receiving nodes;
replicating the encapsulated multicast packet at the virtual replicator; and
transmitting the encapsulated multicast packet over unicast to said plurality of receiving nodes based on said receiver information, said plurality of receiving nodes comprising the tenant multicast application;
wherein the virtual replicator maintains topology state without multicast membership information and operates in a cloud without multicast capability and wherein the tenant multicast application operates in a single virtual machine or container at the host node in the single tenant deployment.

2. The method of claim 1 wherein the host node and the receiving nodes each comprise a packet processing instance running in the same virtual machine as the tenant multicast application.

3. The method of claim 1 wherein said receiver information comprises a bit array and wherein bit positions within said bit array specify the receiving nodes.

4. The method of claim 1 wherein said receiver information comprises a bit indexed explicit replication header and the virtual replicator comprises a bit indexed explicit replication forwarding information base for use in identifying the receiving nodes.

5. The method of claim 1 further comprising splitting a replication load across one or more of the receiving nodes for multi-stage replication.

6. The method of claim 1 wherein the virtual replicator operates in the cloud with at least one other virtual replicator, and wherein replication is load balanced across the virtual replicators.

7. The method of claim 1 wherein the host node and the receiving nodes each comprise a packet processing instance running in the same container as the tenant multicast application.

8. The method of claim 1 wherein the receiver information is located in a header generated at the host node based on information received from membership signaling protocol packets.

9. An apparatus comprising:
a tenant multicast application configured to run in a single virtual machine or container in a single tenant deployment at the apparatus;
a packet processing instance associated with the tenant multicast application and configured to run in the single virtual machine or container;
a processor for inserting receiver information into a multicast packet and transmitting the multicast packet over unicast to a virtual replicator configured to replicate the multicast packet and transmit replicated packets over unicast to a plurality of receiving nodes based on said receiver information said receiver information comprising multicast membership information for use in replicating and transmitting the packet to a plurality of receiving nodes; and
memory for storing said receiver information;
wherein the apparatus is configured for said single tenant deployment in a cloud without multicast capability and wherein the virtual replicator maintains topology state without multicast membership information and operates in a cloud without multicast capability.

10. The apparatus of claim 9 wherein the packet processing instance comprises a vector packet processing instance.

11. The apparatus of claim 9 wherein the receiving nodes each comprise the packet processing instance and the tenant multicast application.

12. The apparatus of claim 9 wherein said receiver information comprises a bit array and wherein bit positions within said bit array specify the receiving nodes.

13. The apparatus of claim 9 wherein the replicated packets are transmitted using stateless multicast.

14. The apparatus of claim 9 wherein said receiver information is received at the apparatus from a controller.

15. The apparatus of claim 9 wherein the processor is further operable to load balance replication between the virtual replicator and at least one other virtual replicator based on network data collected at a controller.

16. A system comprising:

a plurality of local packet processing instances running on a plurality of hosts, each of the hosts comprising a single tenant in a dedicated metal deployment, each of the local packet processing instances associated with a tenant multicast application and configured to encapsulate a multicast packet with receiver information and transmit the multicast packet to a dedicated virtual replicator; and the dedicated virtual replicator for replicating the multicast packet received from one of the hosts and transmitting replicated multicast packets to a portion of said plurality of said hosts based on said receiver information, the dedicated virtual replicator configured to maintain topology state without multicast membership information;

wherein the multicast packets are transmitted over unicast in a cloud without multicast capability and wherein said receiver information comprises multicast membership information inserted into the packet by one of the host nodes for use by the dedicated virtual replicator in replicating and transmitting the packet to a plurality of receiving nodes.

17. The system of claim 16 wherein at least one of said plurality of hosts is configured to replicate one of the received replicated multicast packets and transmits the packet to another of said hosts for multi-stage replication.

18. The system of claim 16 wherein said local packet processing instances and said dedicated virtual replicators form an overlay network and said cloud comprises an underlay network, and wherein migration of a virtual machine associated with the packet processing instance and the tenant multicast application to another of the hosts changes only the underlay network.

19. The system of claim 16 wherein said receiver information comprises a bit array and wherein bit positions in said bit array specify the receiving nodes.

20. The system of claim 16 wherein each of the hosts is configured upon receiving a join message to signal an interest in a receiver joining a multicast group to the other hosts without notifying the dedicated virtual replicator.

* * * * *